United States Patent
Hudson et al.

(10) Patent No.: US 7,542,977 B2
(45) Date of Patent: Jun. 2, 2009

(54) TRANSACTIONAL MEMORY WITH AUTOMATIC OBJECT VERSIONING

(75) Inventors: Richard L. Hudson, Florence, MA (US); Ali-Reza Adl-tabatabai, Santa Clara, CA (US); Bratin Saha, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 11/477,848

(22) Filed: Jun. 29, 2006

(65) Prior Publication Data

US 2008/0021934 A1 Jan. 24, 2008

(51) Int. Cl.
G06F 17/00 (2006.01)
(52) U.S. Cl. .......................................... 707/100; 711/6
(58) Field of Classification Search ............. None
See application file for complete search history.

(56) References Cited

U.S. PATENT DOCUMENTS 6,223,344 B1 * 4/2001 Gerard et al. ................ 717/170
6,826,757 B2 * 11/2004 Steele et al. ................. 719/314

OTHER PUBLICATIONS

Norvag, Kjetil. "Main-Memory Management in Temporal Object Database Systems." Lecture Notes in Computer Science 1884(2000) 362-370. Jun. 23, 2008 <http://citeseerx.ist.psu.edu/viewdoc/summary?doi=10.1.1.36.2355>.*
Brooks, Rodney A., et al., "Trading Data Space for Reduced Time and Code Space in Real-Time Garbarage Collection on Stock Hardware", ACM,(1984),256-262.
Herlihy, Maurice P., et al., "Lock-Free Garbarage Collection for Multiprocessors",*ACM*, (1991),229-236.
Hosking, Antony L., "Lightweight Support for Fine-Grained Persistence on Stock Hardware", *Technical Report 95-02 / Computer Science Department University of Massachusetts at Amherst*, (Feb. 1995),167 pgs.

* cited by examiner

*Primary Examiner*—Mohammad Ali
*Assistant Examiner*—Syed H Hasan
(74) *Attorney, Agent, or Firm*—Blakely, Sokoloff, Taylor & Zafman LLP

(57) ABSTRACT

Embodiments of a system and method for transactional memory (TM) with automatic object versioning are described. Embodiments described herein include a TM system and method that facilitates the execution of object-oriented application programs in a transactional environment, including automatically versioning objects to enhance efficiency. Embodiments of the TM automatically designate versions of objects using pointers, accurately identifying usable and unusable versions. Object versioning as described herein allows the garbage collector to easily and efficiently determine which objects may be moved, freeing memory space and reducing the number of objects traversed by a transaction before finding a useable version of an object. Other embodiments are described and claimed.

12 Claims, 6 Drawing Sheets

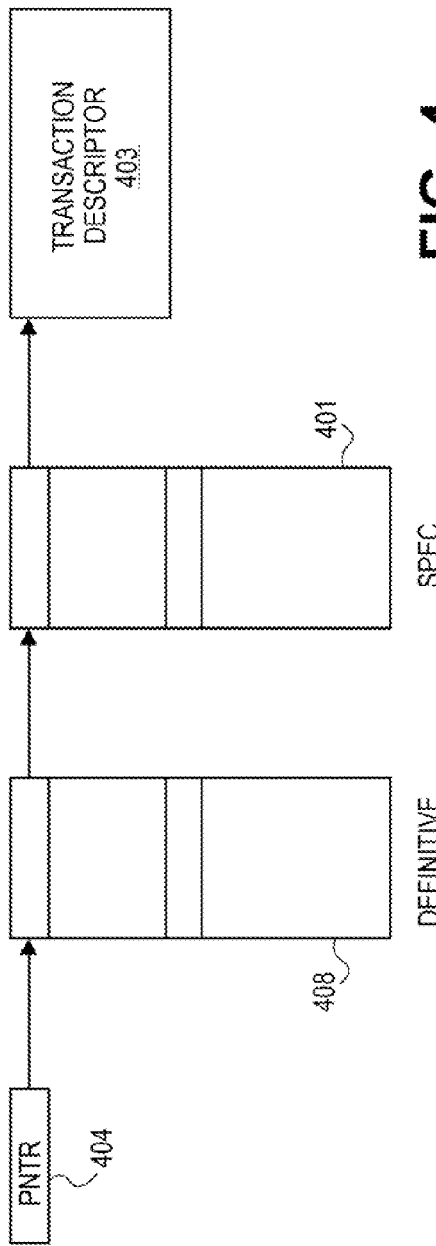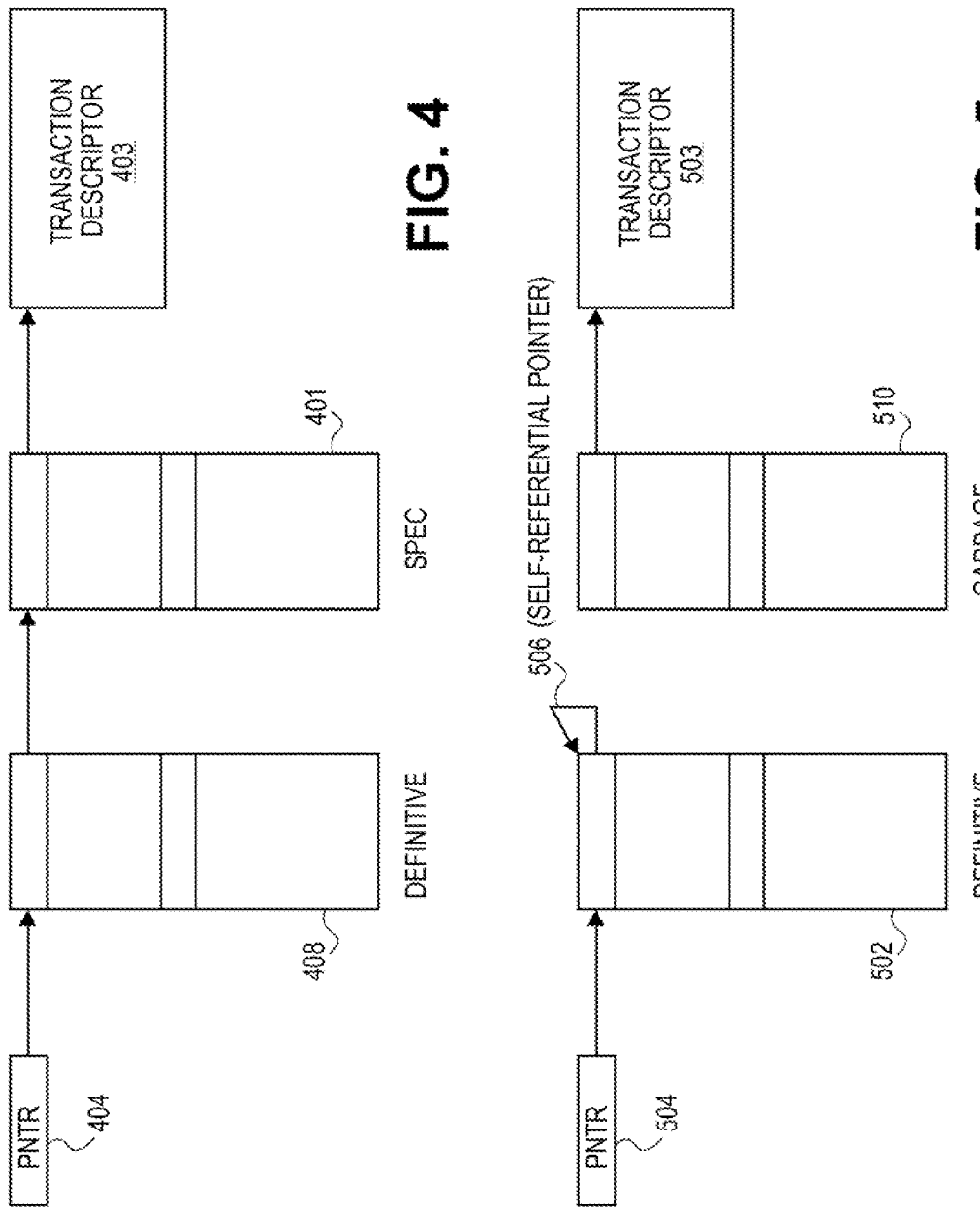

US 7,542,977 B2

TRANSACTIONAL MEMORY WITH AUTOMATIC OBJECT VERSIONING

FIELD OF THE INVENTION

Embodiments are in the field of transactional memory (TM), and particularly in the field of garbage collection in TM environments.

BACKGROUND OF THE DISCLOSURE

Computer systems and applications continually evolve to be ever more complex and capable. Even fairly inexpensive portable personal computer systems are routinely expected to support video application, for example. As a result, there is constant pressure on computer hardware and software developers to support increased capability and speed in systems that are affordable and relatively small. One of the responses to this pressure is central processing units (CPUs) with multiple processing cores that perform parallel processing. Parallel processing involves resource sharing among the multiple cores. Handling memory sharing is a significant challenge. For example, consider a situation in which one processing thread modifies the contents of a portion of memory for later use. Before the processing thread uses the modified contents, another processing thread might overwrites the portion of memory resulting in a loss of consistency between the memory locations. If the contents are not consistent a significant delay, or an error, results. Therefore, software mechanisms for multi-core processors and parallel processing have been developed.

One software mechanisms suitable for parallel processing is transactional memory (TM). TM is a concurrency control mechanism analogous to database transactions for controlling access to shared memory in multi-core computing. TM functions as an alternative to lock-based synchronization, and is typically implemented in a lock-free way. A transaction in this context is a piece of code that executes a series of reads and writes to shared memory. These reads and writes logically occur at a single instant in time, and intermediate states are not visible to other (successful) transactions. One can implement transactional memory either in software or hardware or a combination of the two. Software transactional memory (STM) may be semantically richer while hardware transactional memory (HTM) may have higher performance.

Many popular programming languages are object-oriented languages, such as Java. Object-oriented languages allow for application development in the context of heterogeneous, network-wide, distributed environments. Object-oriented languages may include automatic memory storage management to take over the burden of memory management from the programmer. One way this is accomplished is by using a garbage collector. Current TM systems and methods (referred to herein simply as TMs) may not be adapted to take advantage of all of the efficiencies that object-oriented applications are capable of. For example, current TMs may not efficiently maintain multiple version of objects, where some are speculative, some are definitive, and some are unreachable and therefore garbage. The indirection inherent in object-based garbage collection schemes may provide a mechanism for efficiently identifying and maintaining the various versions of objects, thus improving both memory management as well as the TM mechanisms.

BRIEF DESCRIPTION OF THE DRAWINGS

FIG. 4 is a block diagram of versions of an object during a transaction, according to an embodiment.

FIG. 5 is a block diagram of versions of an object after cleanup, according to an embodiment.

DETAILED DESCRIPTION

Embodiments described herein include a transactional memory system and method (TM) that facilitates the execution of object-oriented application programs in a transactional environment, including automatically versioning objects to enhance efficiency. Embodiments of the TM automatically designate versions of objects as further described below. Object versioning as described herein allows a garbage collector to easily and efficiently determine which objects may be moved by the garbage collector, freeing memory space and reducing the number of objects traversed by a transaction before finding a useable version of an object.

Figure 1:
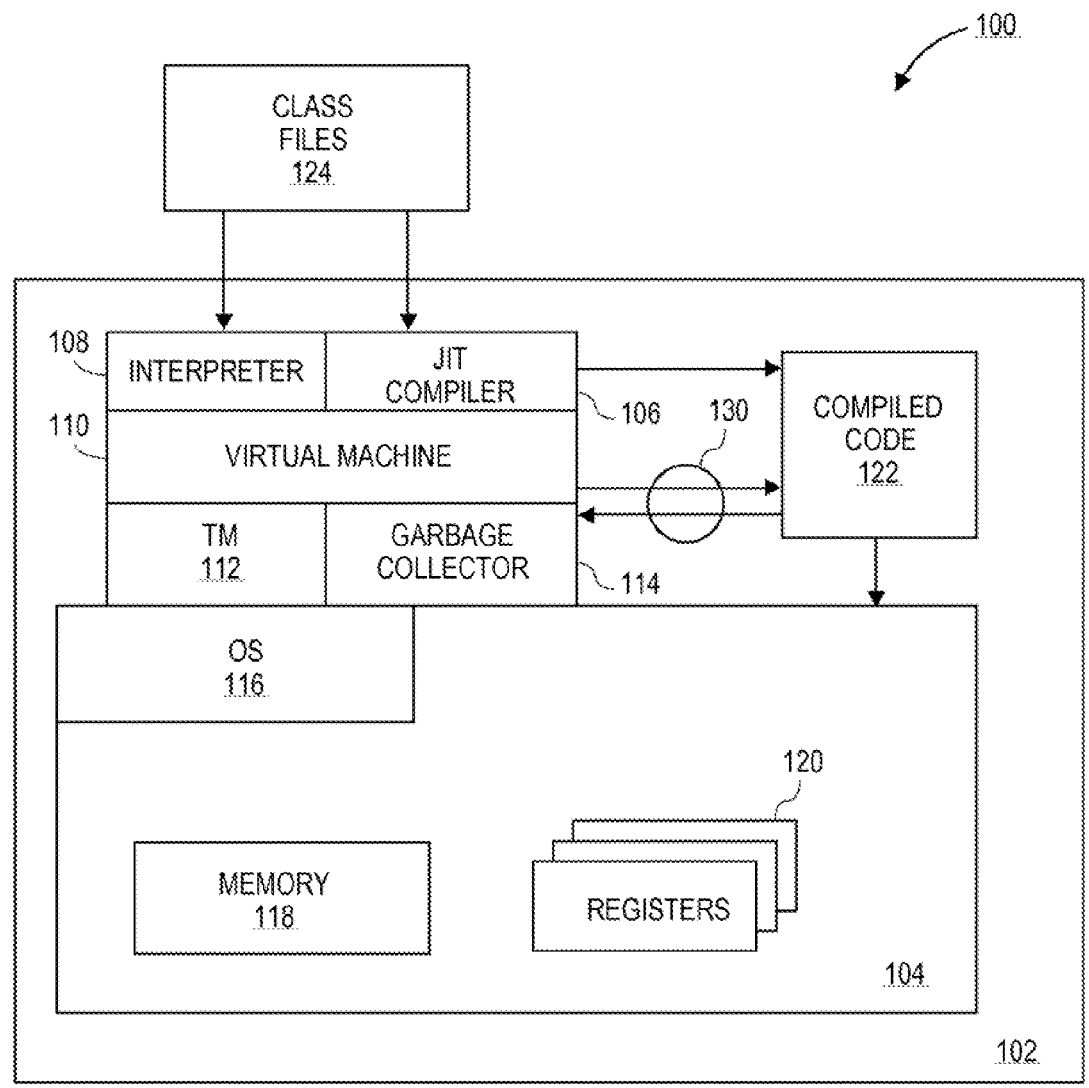
FIG. 1 is a block diagram of elements of a system, including a transactional memory implementation (TM), according to an embodiment.

FIG. 1 is a block diagram of elements of a system 100, including a transactional memory implementation (TM) 112, according to an embodiment. The system 100 is equipped to interpret and compile class files from an object oriented language, such as Java, for example. The system 100 includes computer hardware 104 controlled by an operating system 116. The computer hardware 104 further includes a memory device 118 and machine registers 120. The system 100 also includes a virtual machine (VM) implementation 110 for executing object-oriented code contained in class files 124. In an embodiment, the VM implementation 110 is a Java virtual machine (JVM) and the object-oriented code is Java code, but embodiments are not so limited. The virtual machine (VM) implementation 110 includes a garbage collector 114, and a TM 112.

When class filed 124 are downloaded during operation of the system 100, an interpreter 108 may begin interpreting the class files 124 such that the object-oriented code is executed. Alternatively, a just-in-time compiler (JIT) 106 may compile the class files 124 and generate compiled code 122 in the form of native processor code. The compiled code 122 may be directly executed by computer hardware 104. In order to maintain the state of the VM 110 and to make system calls, compiled code 122 may make calls 130 into VM 110. Likewise VM 110 makes calls 130 to compiled code 122 to cause it to execute on the computer hardware 104. The TM 112, as further described below, facilitates the execution of the code in a transactional environment.

An object, as referred to herein, is a collection of contiguous memory locations, lying in a single region that can be addressed and accessed via references. A reference, also called a pointer, is the address of an object. Objects do not overlap and may be relocated independently of one another by the garbage collector. In some cases, an object may correspond to a Java object. An object may contain slots, non-slot data, or both. A slot is a memory location that may contain a reference (pointer) to an object. A slot may also refer to no object, that is, it may contain the null pointer.

In an embodiment, the TM 112 automatically designates versions of objects, such that the versions are easily identifiable as old, speculative, or definitive. The identification is useful to transactions seeking to access an object, because embodiments eliminate the need to traverse several unusable versions before finding a version the transaction can use. In addition, embodiments make it easy for an existing garbage collector to clean up unusable object versions and free the memory space they occupy.

In an embodiment, the TM 112 is non-blocking. For example, if a transaction T1 detects a conflict (also referred to as contention) with another transaction T2, T1 can decide to either: 1) back off and let T2 continue; or 2) abort T2 and cleanup enough of T2's state so that T1 can continue execution. In other embodiments, a blocking TM 112 scheme may be employed.

In an embodiment, the TM 112 works at the granularity of objects, but embodiments are not so limited. In an embodiment, the TM 112 is implemented in Java, but could be implemented in any other suitable language. A Java virtual machine (JVM) and just-in-time compiler (JIT) can use embodiments to provide transactional semantics automatically for existing types in an application program. Embodiments increase the efficiency of object-oriented application programs using TM 112 by removing the indirection inherent in object-oriented schemes.

In an embodiment, object versioning is applied to allow optimistic concurrency. At any point in time several versions of the same object may exist, but only one definitive version represents the most up-to-date non-speculative globally visible version of the object. A transaction that writes to an object creates a new, speculative version of the object. The speculative version is a clone of the definitive version of the object. When the speculative version of the object is successfully committed, the transaction automatically makes the speculative version of the object the definitive version. In other embodiments, pessimistic schemes are implemented.

Each transaction has a transaction descriptor (also referred to as a descriptor) object that tracks the state of the transaction and maintains the read and write sets of the transaction. States of the transaction may include "active", "aborted", and "committed". The read and write sets contain references to the object versions that the transaction has read or written, respectively.

Figure 2:
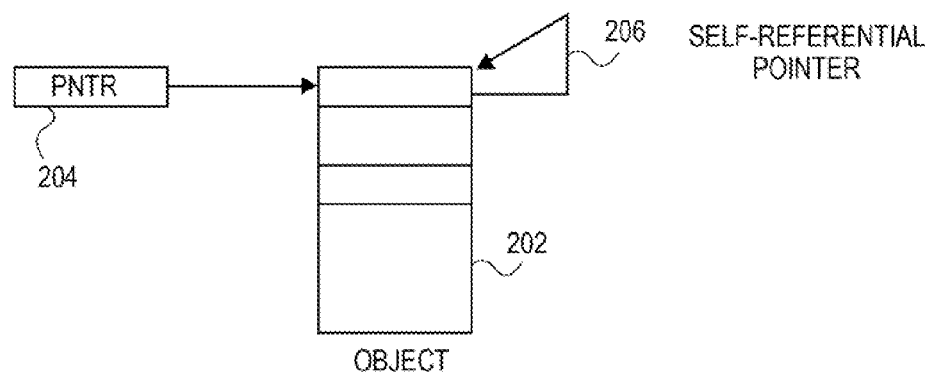
FIG. 2 is a block diagram of an object and a pointer, according to an embodiment.

FIG. 2 is a block diagram of an object and a pointer according to an embodiment. A slot 204 holds a pointer (PNTR) to an object 202. The slot 204 can be in another object on the heap, in a globally accessible location, on a stack, or in a register. In an embodiment, the pointer points to the first word in the object 202. The virtual machine, such as the VM 110 adds a forwarding pointer to each object. This illustrates a typical case involving only one object. The forwarding pointer shown by arrow 206 is a self-referential pointer that transitively refers to the definitive version of the object 202. Alternatively the field may hold information, possibly using distinguished bits, that distinguishes what the slot holds. In general in the embodiments described, a transaction seeking to access objects traverses forwarding pointers associated with the object to find a usable version of the object. As will be further described below, the transaction further modifies forwarding pointers to reflect a current version of an object, for example, based on the transaction.

Figure 3:
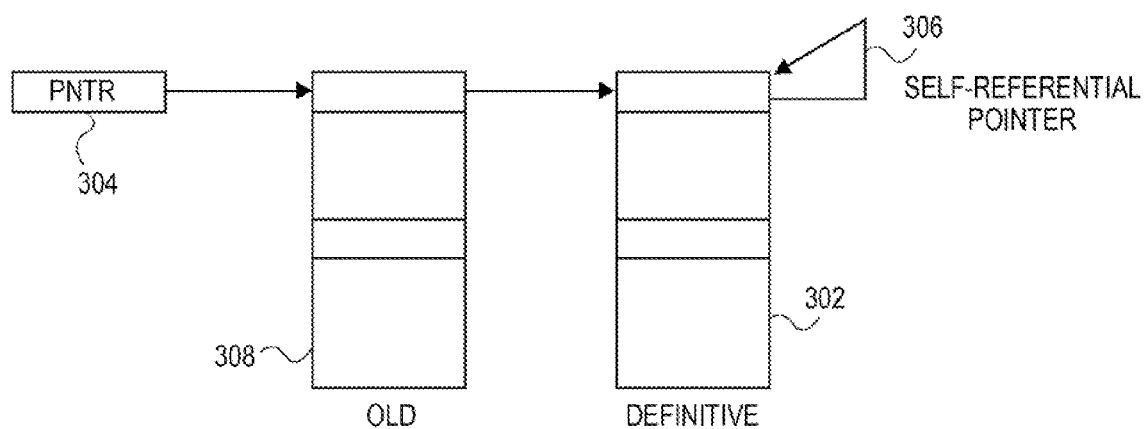
FIG. 3 is a block diagram of objects, illustrating a case in which there is more than one version of an object, according to an embodiment.

FIG. 3 is a block diagram illustrating a case in which there is more than one version of an object, specifically an old version 308 and a definitive version 302. A pointer in a slot 304 refers to the old version 308, which in turn refers to the definitive version 302. The definitive version 302 of the object includes a self-referential forwarding pointer shown by arrow 306. There may be multiple older versions, forming a list of versions threaded through the forwarding pointer.

When a transaction creates a speculative version "S", the transaction sets the forwarding pointer of S to point to a transaction descriptor associated with S. This is illustrated in FIG. 4, which is a block diagram of versions of an object during a transaction, including a speculative version of an object. In FIG. 4, a slot 404 holds a pointer to the definitive version 408, which in turn holds a pointer to a speculative version 401. The speculative version 401 holds a pointer, placed in the version 401 by the transaction, to its transaction descriptor 403.

Upon committing, the transaction makes the forwarding pointer of any speculative versions it created self-referential so that these versions become definitive versions, resulting in the situation of FIG. 3. The previous definitive version becomes an old version.

Upon aborting, a transaction cleans up by making the forwarding pointers of any definitive version in its write set self-referential if it points to a speculative version that the transaction created. This situation is illustrated in FIG. 5, which is a block diagram of versions of an object after cleanup. A slot 504 holds a pointer to a definitive version 502, which includes a self-referential pointer as shown by arrow 506. A version 510 holds a pointer to a transaction descriptor. Version 510 is now unreachable because there are no pointers to it. Therefore, version 510 is now garbage and is subject to reclamation by the garbage collector. Version 502 was previously a definitive version of an object in the write set of the transaction, and previously pointed to a speculative version (now garbage) 510. Because the transaction made the version 502 pointer self-referential, the unusable version 510 becomes garbage, and the memory occupied by version 510 can be made available again.

Figure 6:
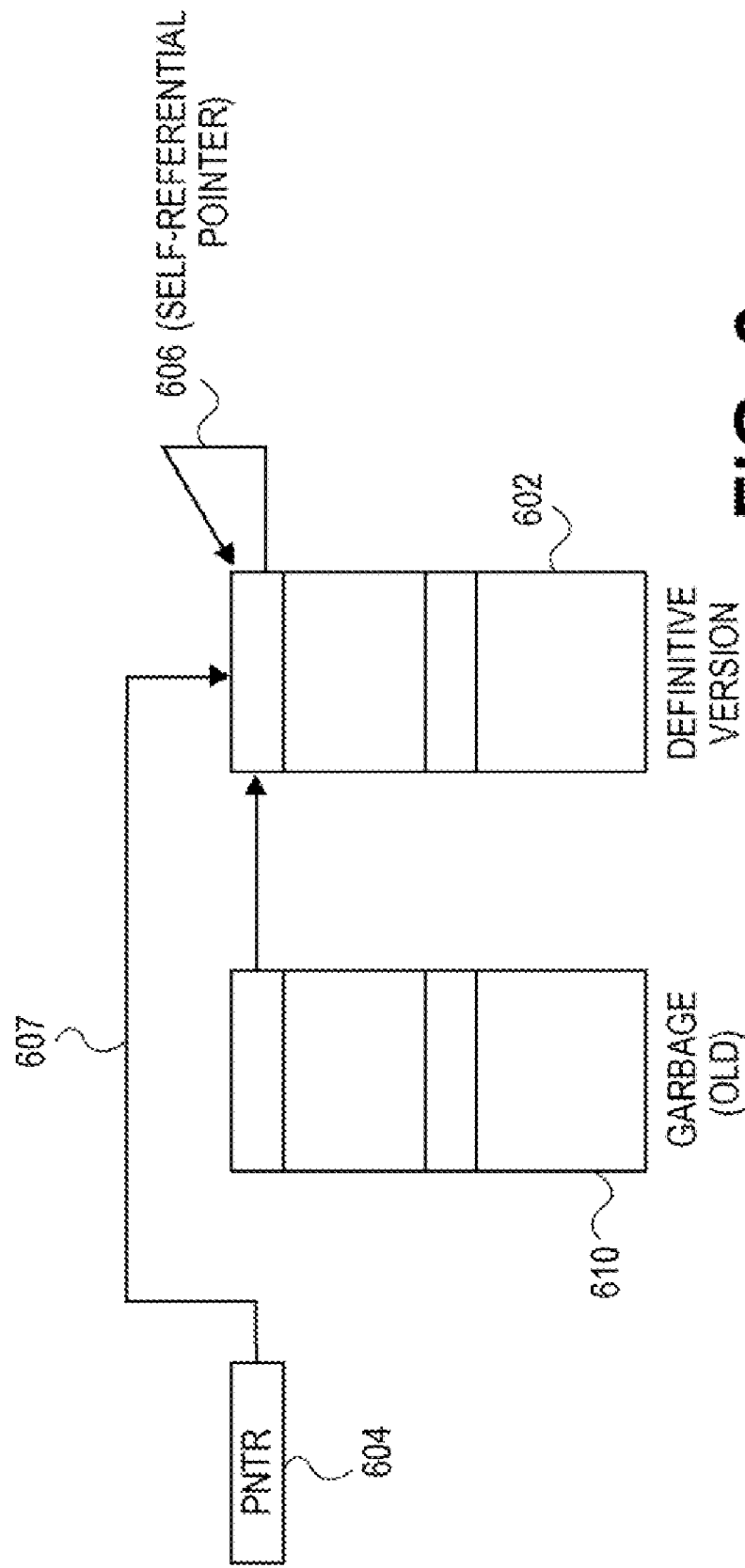
FIG. 6 is a block diagram illustrating path compression as performed by the garbage collector using pointers, according to an embodiment.

In an embodiment, during its normal heap traversal, the garbage collector performs path compression by updating references that point to an old version so that they point to definitive versions. FIG. 6 is a block diagram illustrating path compression as performed by the garbage collector using the pointers as modified by the transaction. A slot 604 holds a pointer to a definitive version 602, as illustrated by an arrow 607. In an embodiment, the garbage collector recognizes the definitive version 602 by its self-referential pointer (shown by an arrow 606) and updates references (pointers) accordingly. Previously, the slot 604 held a pointer to an old version 610, which is now garbage, because it is not referred to. Version 610 is thus made available for reclamation by the garbage collector.

In various situations, an object can have multiple speculative versions. Each speculative version holds a pointer with a transaction descriptor associated with the "owner" transaction. When transaction T1 is committed, the speculative object belonging to T1 becomes the definitive version of the object.

The state of a speculative object "S" that points to a transaction descriptor "T" (as shown in FIG. 4, for example) depends on the state of T. There are typically three states to consider: T is aborted; T is committed; or T is active. If T is active, then object S is a speculative version. Depending on whether T commits or aborts, S may become either the definitive object or a garbage object.

Figure 7:
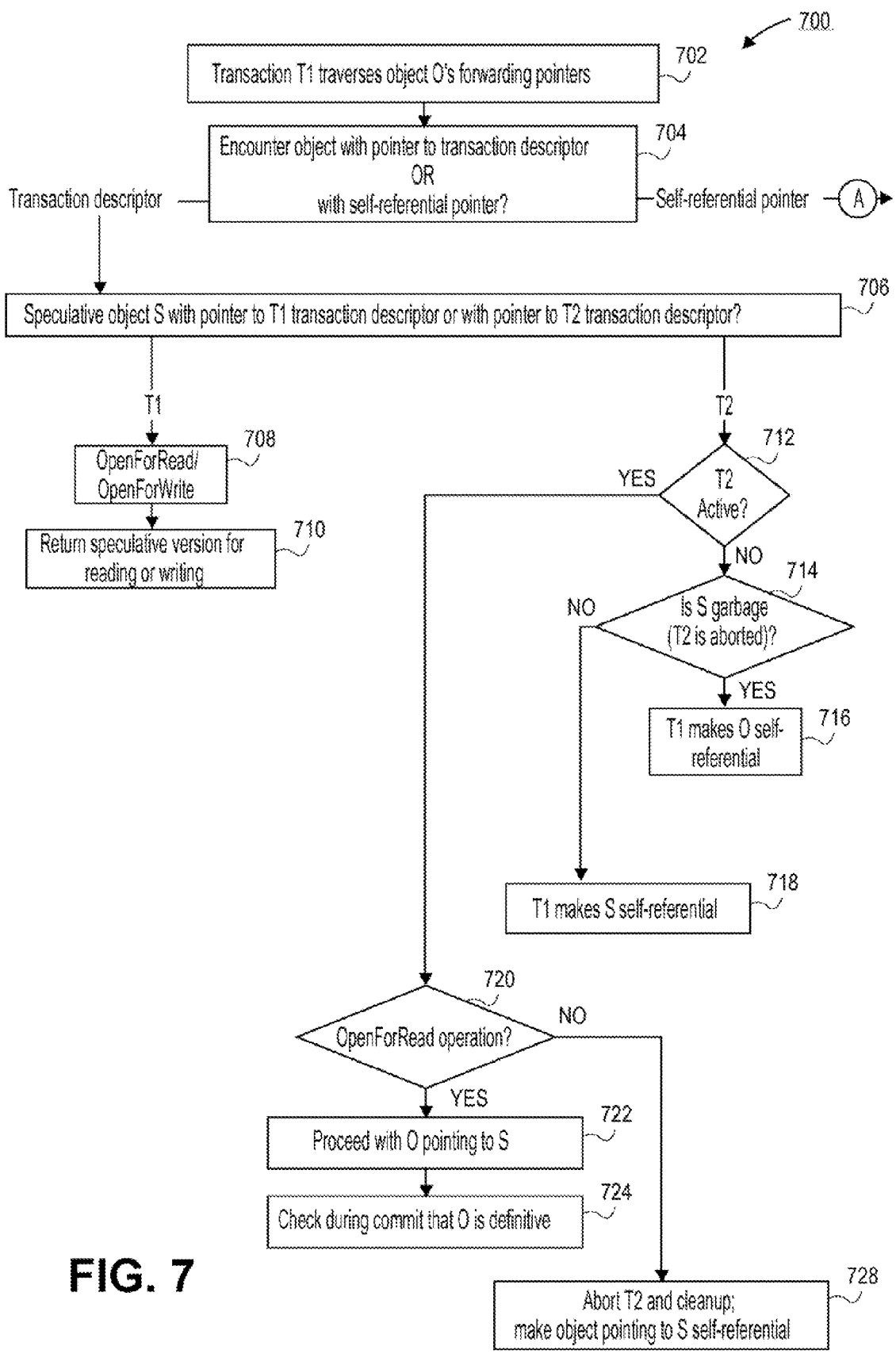
FIGS. 7 and 8 are a flow diagram of a method for object versioning, according to an embodiment.
Figure 8:
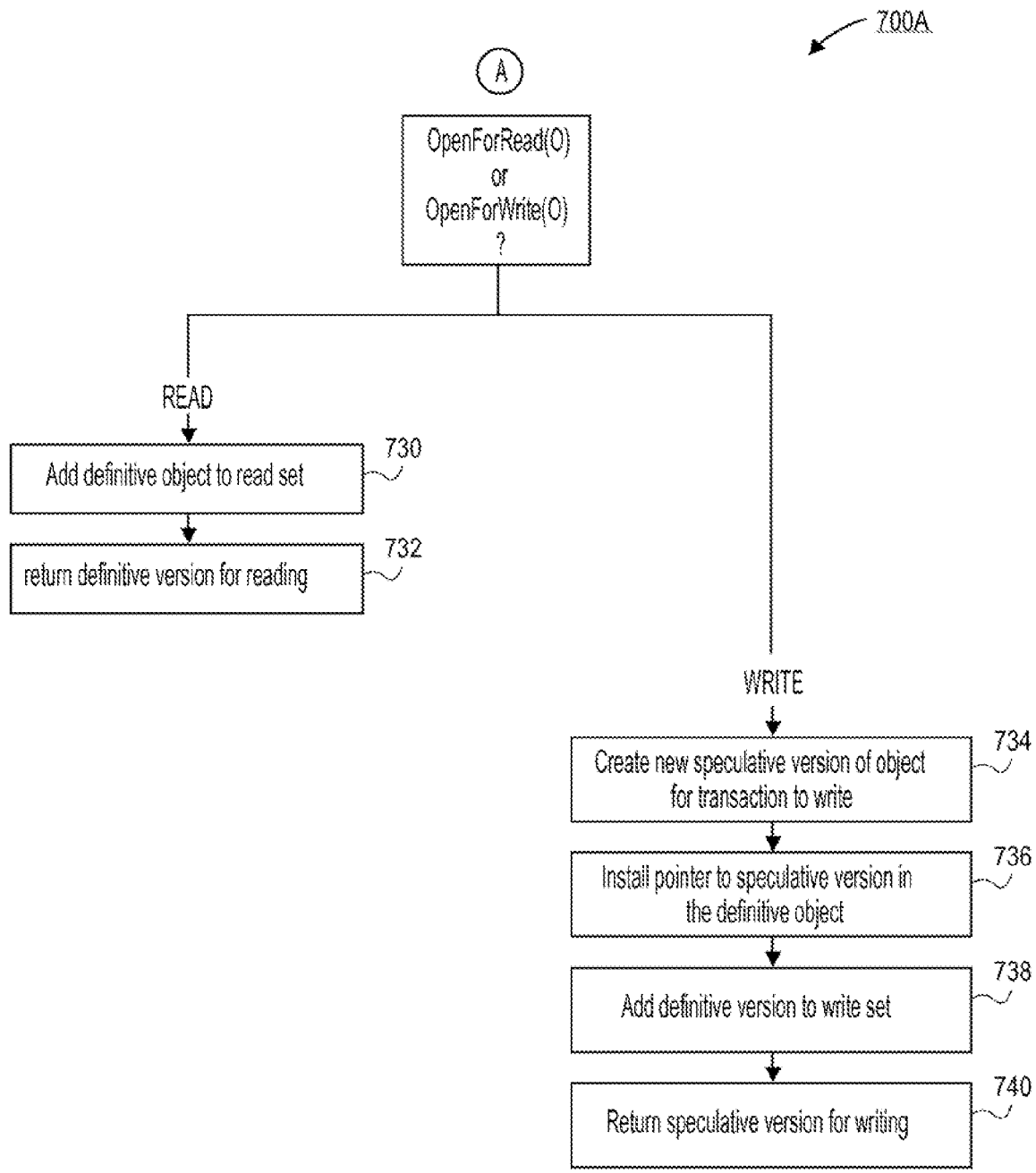

Consider the transaction T1 seeking to access an object "O". Before accessing the object O's field, the transaction T1 must first perform an OpenForRead operation or an OpenForWrite operation. These operations return a version of the object suitable for reading or writing, respectively. An open operation first traverses the forwarding pointers until it finds either a definitive object or a speculative object pointing to a transaction descriptor. Various cases may be encountered. FIGS. 7 and 8 are a flow diagram of a method for object versioning, according to an embodiment. The method includes accessing an object, including handling the various cases, according to a TM embodiment.

Referring first to FIG. 7, a method 700 begins with a transaction T1 traversing forwarding pointers of an object O at 702. T1 determines, at 704, whether it encounters a forwarding pointer that is self-referential (indicating a definitive object), or a pointer to a transaction descriptor. If T1 encounters neither, it continues traversing at 702. If T1 does encounter a self-referential forwarding pointer or a pointer to a transaction descriptor, there are, in general, three cases to consider. The first case is the case of the self-referential pointer, which indicates a definitive object. The second case is the case of a pointer of a speculative object which points to a transaction descriptor belonging to T1. The third case is the case of a pointer of a speculative object which points to a transaction descriptor belonging to a different transaction, T2. Each of the cases will be described with reference to FIGS. 7 and 8. The first case will be described with reference to a method 700A in FIG. 8. First, however, the other second and third cases will be described with further reference to FIG. 7.

If a pointer of a speculative object which points to a transaction descriptor is encountered, it is determined at 706 whether the transaction descriptor belongs to T1 or to another transaction T2. If the transaction descriptor belongs to T1, an OpenForRead operation or OpenForWrite operation, as applicable, is initiated at 708 and a speculative version of the object is returned for reading or writing at 710.

If the transaction descriptor belongs to T2, it is then determined at 712 whether T2 is active. If T2 is active, it indicates that there is contention for the object among transactions T1 and T2. According to embodiments as described herein, any contention strategy may be executed upon encountering contention. In the particular example of FIGS. 7 and 8, a non-blocking contention strategy is illustrated that includes taking actions to make it possible for the transaction to proceed, but embodiments are not so limited.

In an embodiment, if transaction T2 is active, T2 is completed in a manner based on the character of T2, as further described below. If T2 is active, it is determined at 720 whether the operation is an OpenForRead operation. If the operation is an OpenForRead operation, the operation proceeds with the definitive object O (which points to a speculative version S) of the object O at 722. While committing the transaction at 724, a check is made to determine whether O is still the definitive version.

If the operation is not an OpenForRead operation, as determined at 720, T2 is aborted and cleanup is performed at 728, including modifying the forwarding pointer of the object pointing to speculative object S such that the pointer becomes self-referential and the object becomes definitive. Alternatively (not shown), if the operation is an OpenForRead operation, as determined at 720, could abort T2 and perform cleanup at 728, including modifying the forwarding pointer of the object pointing to speculative object S such that the pointer becomes self-referential and the object becomes definitive. T1 could then use the definitive object O for reading.

If the operation is an OpenForWrite then T1 may either abort itself, proceed with its own speculative version, abort T2, or wait for T2 to complete before proceeding. If T1 aborts itself then T2 may be allowed to continue unimpeded. T1 may create its own speculative version and proceed with that version. Before committing T1 may need to validate that object O is still the definitive object version. Upon commit T1 may eagerly abort or may lazily allow T2 to discover that T2 needs to abort. If T1 aborts T2 it may adjust T2's transaction descriptor to indicate the abort. T1 may then create its own speculative version S of object O referring to T1's transaction descriptor and proceed using the newly created speculative version of the object.

Returning to 712, if T2 is not active, it is determined at 714 whether T2 is aborted, which would indicate that T2's speculative version S is garbage. If T2 is committed, T1 "helps out" and makes version S self-referential, or definitive, by modifying S's pointer. If T2 is aborted, T1 makes object O self-referential, or definitive, by modifying its pointer.

Returning to 704, if a self-referential pointer is encountered during T1's traversal, the operation continues with method 700A as illustrated in FIG. 8. With reference to 728, it is determined whether the operation is an OpenForRead operation or and OpenForWrite operation. If the operation is an OpenForRead operation, the definitive object, as may be identified by a self-referential pointer, is added to the read set of T1 at 730, and the definitive version is returned for reading at 732.

If the operation is an OpenForWrite operation, a new speculative version of the object is created for writing by T1 at 734. A pointer to the speculative version is installed in the definitive object at 736. The definitive version is added to the write set of T1 at 738, and the speculative version is returned for writing at 740.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The term "processor" as generally used herein refers to any logic processing unit, such as one or more central processing units ("CPU"), digital signal processors ("DSP"), application-specific integrated circuits ("ASIC"), etc. While the term "component" is generally used herein, it is understood that "component" includes circuitry, components, modules, and/ or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A computer-implemented transactional memory (TM) method, implemented on a processor, comprising:
   determining a version of an object, the version indicating that the object is one of a definitive version wherein at most one definitive version exists for the object, a previously definitive version, or a speculative version created by a transaction writing to the object;
   automatically indicating the version of the object using pointers associated with the object, wherein automatically indicating comprises
      indicating the object version is definitive by modifying one of the pointers associated with the object to be a self-referential pointer that points to the object itself,
      indicating the object is a previously definitive version of the object by modifying the object's self-referential pointer to point to a definitive version of the object, and
      indicating the object version is speculative by modifying one of the pointers associated with the object to point to a transaction descriptor of the transaction that created the speculative object, the transaction descriptor describing at least the transaction state as active, aborted, or committed wherein any speculative object pointing to a transaction descriptor describing the state of the transaction as aborted is subject to reclamation by a memory manager;
   providing access to the object for a transaction T1 by traversing the pointers associated with the object wherein when the object version is speculative,
      determining that the speculative version of the object includes a pointer to one of a transaction descriptor associated with T1 and a transaction descriptor associated with another transaction T2, and
      executing a contention strategy for the speculative version of the object when it includes a pointer to the transaction descriptor associated with T2, wherein the speculative version of the object is modified to be a definitive version of the object.

2. The method of claim 1, further comprising reading the transaction descriptor pointed to by the at least one pointer to determine:
   whether the at least one pointer includes a self-referential pointer, indicating that the object is a definitive version of the object; and
   whether the object is a speculative version of the object.

3. The method of claim 1, wherein executing a contention strategy further comprises:
   executing a non-blocking contention strategy comprising:
      determining whether transaction T2 is active;
      if T2 is active, completing T2 in a manner based on a character of T2; and
      modifying one of the pointers to the at least one speculative version of the object to reflect a correct version of the object to indicate the speculative version of the object is currently a definitive version of the object.

4. The method of claim 1 wherein automatically indicating the version of the object is speculative further comprises automatically updating any definitive version of the object to point to the new, speculative version of the object.

5. A system, comprising:
   a virtual machine, coupled to a processor, and configured to execute code contained in class files; and
   a transactional memory (TM) implementation coupled to the virtual machine to facilitate execution of the code in a transactional environment, wherein the TM implementation automatically indicates a version of an object using pointers associated with the object, wherein automatically indicating further comprises
      indicating the object version is definitive by modifying one of the pointers associated with the object to be a self-referential pointer that points to the object itself, indicating the object is a previously definitive version of the object by modifying the object's self-referential pointer to point to a definitive version of the object, and indicating the object version is speculative by modifying one of the pointers associated with the object to point to a transaction descriptor of the transaction that created the speculative object, the transaction descriptor describing at least the transaction state as active, aborted, or committed wherein any speculative object pointing to a transaction descriptor describing the state of the transaction as aborted is subject to reclamation by a memory manager, further wherein the TM implementation facilitates a transaction seeking to access an object to traverse pointers associated with the object, reads a transaction descriptor pointed to by one of the pointers, wherein the descriptor indicates that contention for the object exists; and executes a contention strategy to modify the pointer to indicate a definitive version of the object.

6. The system of claim 5, wherein the TM implementation further:

reads a transaction descriptor pointed to by one of the pointers, wherein the transaction descriptor indicates whether the version of the object is definitive or speculative;

if the version of the object is definitive, determines whether the transaction includes a read operation or a write operation.

7. The system of claim 6, wherein:

the TM implementation adds the definitive object to a read set of the transaction if the transaction includes a read operation; and the TM implementation creates a new, speculative version of the object for the transaction to write, and automatically installs a pointer to the speculative version in the definitive version if the transaction includes a write operation.

8. The system of claim 5, wherein automatically indicating the version of the object is speculative further comprises automatically updating any definitive version of the object to point to the new, speculative version of the object.

9. A computer-readable storage medium having stored thereon instructions which when executed in a system cause the system to perform a method, the method comprising:

facilitating execution of object-oriented software application code in a transactional environment, comprising traversing forwarding pointers associated with an object that a transaction seeks to access;

determining a version of the object, the version indicating that the object is one of a definitive version, wherein at most one definitive version exists for the object, a previously definitive version, or a speculative version; and indicating the version of the object using the forward pointers associated with the object wherein indicating comprises indicating the object version is definitive by modifying one of the pointers associated with the object to be a self-referential pointer that points to the object itself, indicating the object is a previously definitive version of the object by modifying the object's self-referential pointer to point to a definitive version of the object, and indicating the object version is speculative by modifying one of the pointers associated with the object to point to a transaction descriptor of the transaction that created the speculative object, the transaction descriptor describing at least the transaction state as active, aborted, or committed wherein any speculative object pointing to a transaction descriptor describing the state of the transaction as aborted is subject to reclamation by a memory manager;

determining that there is contention for the object among transactions;

executing a contention strategy; and modifying at least one pointer after execution of the contention strategy to indicate a definitive version of the object.

10. The storage medium of claim 9, wherein the method further comprises:

determining whether the object includes a self-referential pointer; and determining whether a pointer that is not a self-referential pointer points to a transaction descriptor that is associated with the transaction or with another transaction.

11. The computer-readable storage medium of claim 9, wherein the contention strategy comprises a non-blocking contention strategy that comprises taking actions to make it possible for the transaction to proceed.

12. The storage medium of claim 9 wherein automatically indicating the version of the object is speculative further comprises automatically updating any definitive version of the object to point to the new, speculative version of the object.

* * * * *